June 21, 1927. 1,633,473
E. C. BUSH
GUIDING OR CONTROLLING MECHANISM FOR TRUCKS OR THE LIKE
Filed Dec. 19, 1924 2 Sheets-Sheet 1
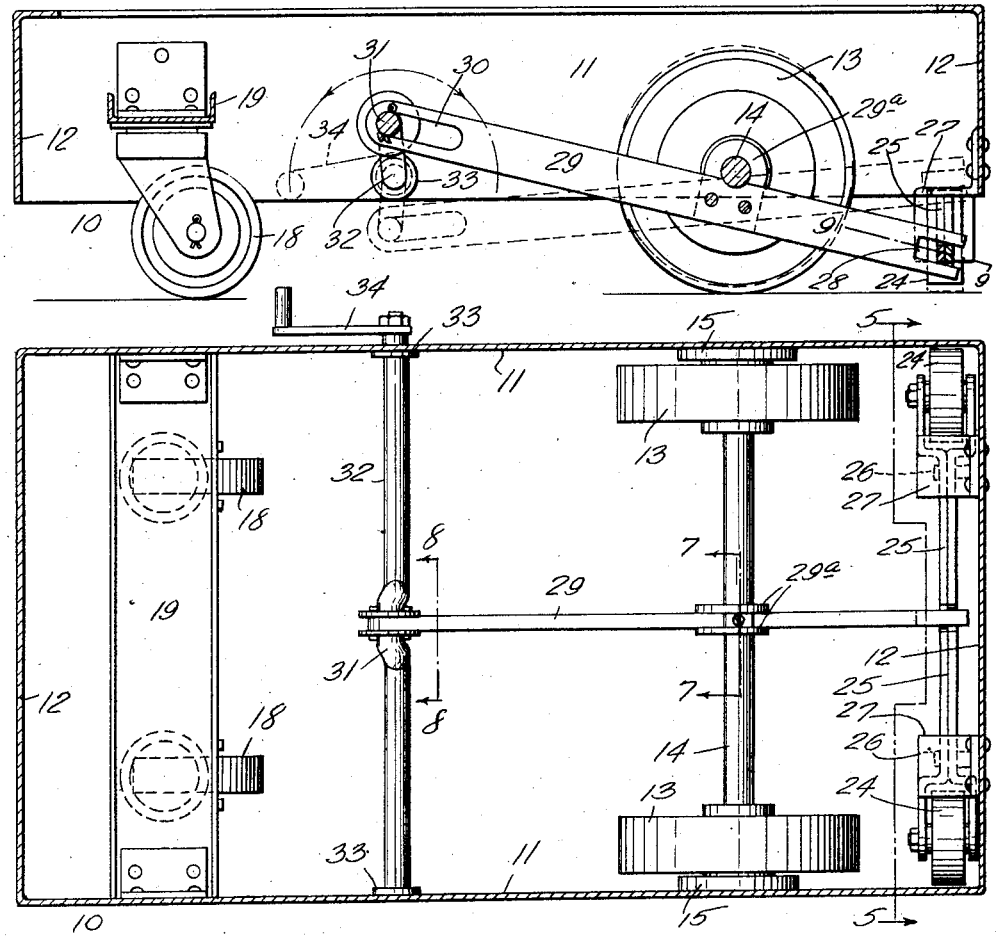
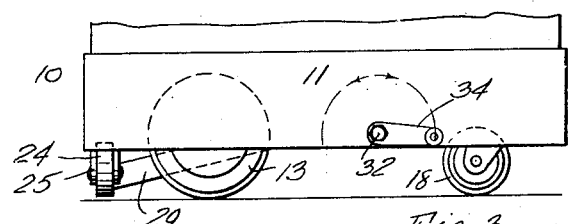
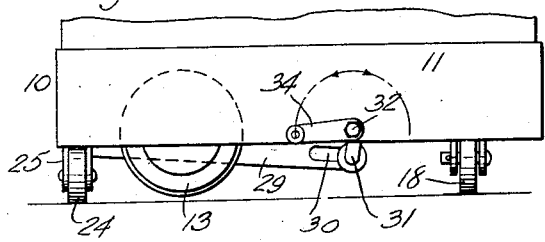
INVENTOR.
Ellis Clyde Bush,
by Parker Brockmar & Bean
ATTORNEYS June 21, 1927.  
E. C. BUSH  
1,633,473  
GUIDING OR CONTROLLING MECHANISM FOR TRUCKS OR THE LIKE  
Filed Dec. 19, 1924  2 Sheets-Sheet 2

INVENTOR.  
Ellis Clyde Bush  
by Parker, Prochnow & Rau  
ATTORNEYS.

Patented June 21, 1927.

1,633,473

UNITED STATES PATENT OFFICE.

ELLIS CLYDE BUSH, OF JAMESTOWN, NEW YORK, ASSIGNOR TO ART METAL CONSTRUCTION COMPANY, OF JAMESTOWN, NEW YORK.

GUIDING OR CONTROLLING MECHANISM FOR TRUCKS OR THE LIKE.

Application filed December 19, 1924. Serial No. 757,052.

This invention relates to improvements in guiding or controlling means for hand propelled trucks or omnibuses and the like wheeled devices. More particularly, the invention relates to trucks or devices having a pair of main supporting wheels arranged to rotate about fixed axes, and one or more swivel wheels or casters cooperating with the main wheels to permit the device to be moved lengthwise and steered and turned bodily in various directions. Trucks or devices of this sort are used in banks and other establishments for supporting and transporting cabinets, cases or other heavy objects so that they may be readily moved from place to place, as for instance, from the bank vault to a position in the teller's cage, or beneath the teller's counter. In the usual arrangement of the counters or other fixtures and equipment in such places the space beneath the counter or elsewhere into which the truck and its load is to be moved is quite restricted, often only a few inches wider than the truck. It is desirable, therefore, that the truck be so constructed that it can be moved parallel to the counter or other object to a position directly in front of the space it is to occupy, and then be moved sideways directly at right angles to its former direction of movement into this space. Devices of this sort heretofore in use have not fully met these requirements, and considerable difficulty has been experienced in moving them into their intended positions in restricted spaces, or such previous devices have been more or less complicated in construction or troublesome to operate and liable to get out of order.

The principal object of the invention is to provide a truck or device of the character described, which is constructed so that it may be readily rolled about on its wheels and steered in the usual way, and which truck is provided with guiding or controlling mechanism which is operable to permit the truck to be moved in directions at right angles to each other, or endwise and sidewise of itself without turning the truck.

Other objects are to provide a device of this sort having a pair of auxiliary wheels arranged at right angles to the carrying wheels and which are normally elevated off of the floor on which the device rests; and means for lowering these auxiliary wheels into engagement with the floor and elevating said carrying wheels therefrom to permit side wise movements of the device by cooperation of said auxiliary wheels with swivelled casters on the truck; also to construct a guiding or controlling mechanism which is easily actuated and is positively held in its operative and inoperative positions; also to construct a truck or device of this sort having a frame or bed within which said controlling mechanism may be assembled in compact form; and also to improve and simplify devices of this sort in the other respects hereinafter specified and claimed.

In the accompanying drawings:—

Fig. 1 is a longitudinal sectional elevation of a truck or omnibus embodying the invention.

Fig. 2 is a plan view thereof showing the frame of the device in section.

Figs. 3 and 4 are side elevations, on a reduced scale, showing two different positions of the supporting and controlling means of the device.

Figure 5:
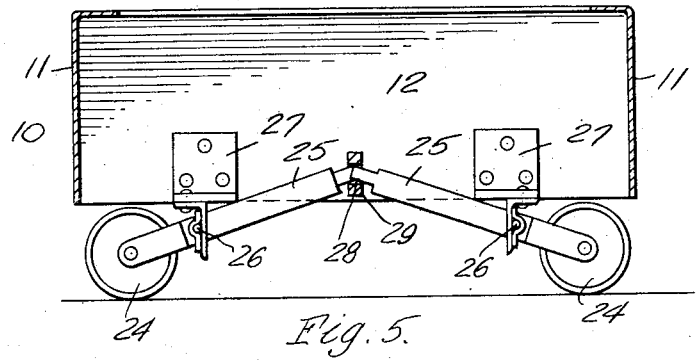
Figs. 5 and 6 are transverse sectional elevations on line 5—5, Fig. 2, showing the lowered and raised positions respectively of the auxiliary wheels and part of the actuating mechanism therefor.

In the embodiment of the invention shown in the drawings, the truck or device comprises a rectangular open bed or frame 10 upon which a cabinet or other load is adapted to be placed and supported, and which includes opposite side and end walls 11 and 12 respectively. A pair of main supporting wheels 13 is arranged to rotate on a transverse axle 14 mounted at its opposite ends in fixed bearings 15 secured to the inner faces of the side walls 11. These wheels 13 are arranged near one end of the frame 10, and a pair of swivel casters 18 is provided on the frame adjacent its opposite end, being in the construction shown swivelled on the underside of a cross brace or member 19 extending from one side wall 11 to the other, so that the casters 18 may roll on the floor and swivel freely in all directions about vertical axes. As thus described, the truck is supported on the wheels 13 and casters 18 and may be pushed or rolled in a direction parallel to its length and turned bodily in any direction desired along a curved path, due to the action of the swivel casters. The controlling mechanism for permitting the device to be moved in a direction transversely to its length in the illustrated embodiment thereof is arranged as follows:

The truck is provided, at that end thereof farthest from the casters 18 and on the opposite side of the axle 14 with two wheels 24 which are journalled to rotate in a plane at right angles to the planes of rotation of the wheels 13, and are normally raised off of the floor so that the device is normally supported by the wheels 13 and casters 18, as described. The wheels 24 are adapted to be lowered onto the floor and the main wheels 13 raised off of the floor so that the truck can be supported by the wheels 24 and casters 18, and then be adapted, when so supported, to roll on the wheels 24 and casters 18 in a direction at right angles to that in which it moves when resting on the main wheels 13. The wheels 24 are preferably disposed adjacent the corners of the frame 10 and are journalled on the outer ends of two transverse levers 25 which are pivotally supported at 26 between their ends and adjacent the wheels 24 on depending portions of brackets 27 fixed on the adjacent end wall 12 of the bed. The inner ends of the two levers 25 extend into an opening 28 in one end of an operating lever 29, or may be otherwise suitably connected to the lever, which extends longitudinally of the truck midway between the side walls 11 thereof, and is pivotally mounted between its ends on the axle 14 for the wheels 13 by bearings 29ª or otherwise. The other end of the lever 29 is provided with a slot 30 which receives an offset or crank 31 of a transverse crank shaft 32 journalled at its opposite ends in bearings 33 on the side walls 11 of the truck.

Figure 6:
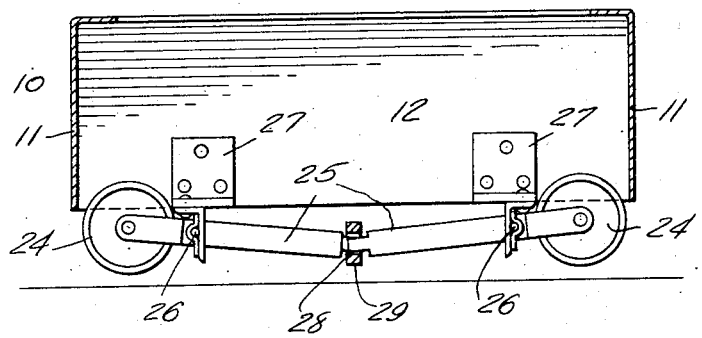
Figure 7:
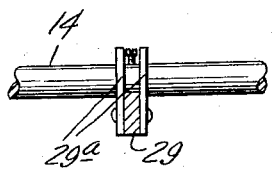
Fig. 7 is a fragmentary transverse section on line 7—7, Fig. 2.
Figure 8:
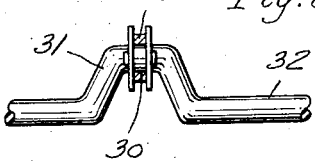
Fig. 8 is a similar view on line 8—8, Fig. 2.
Figure 9:
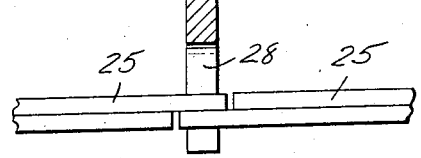
Fig. 9 is a transverse sectional plan view of a portion of the controlling mechanism on line 9—9, Fig. 1.

When the truck is to be moved lengthwise from place to place on the wheels 13 and casters 18, the wheels 24, levers 25, operating lever 29 and crank shaft 32 are in the positions shown in Figs. 1 and 6, with the wheels 24 raised off of the floor. When it is desired to move the truck in a sidewise direction, the crank shaft is actuated by means of a suitable crank or handle 34 attached thereto outside of the frame, so as to swing its crank 31 through an arc slightly greater than 180°, as shown in Fig. 1, thereby swinging the operating lever 29 on its pivot to elevate the inner ends of the levers 25 and lower the wheels 24 onto the floor. The crank shaft 32 in turning through the arc described moves the crank 31 slightly beyond its upper and lower dead center positions, in which positions the crank is positively retained by its engagement with the outer end of the slot 30, thus locking the levers 25 and wheels 24 in both the raised or lowered positions.

The proportions of the actuating parts just described is such that the wheels 24 are lowered to the floor before the completion of the stroke of the crank 31 to its upper position, and the remaining portion of its stroke, while continuing the swinging of the levers 25 through the lever 29, causes the levers 25 and 29 to act together, due to the resistance offered by the engagement of the wheels 24 with the floor, to thereby force the axle 14 upwardly and elevate the carrying wheels 13 and adjacent end of the truck until the crank is arrested by the outer end of the slot 30. The truck will now rest on the wheels 24 and casters 18 so that by pushing the same sidewise it may be moved bodily in a direction at right angles to its path of travel on the wheels 13 and casters 18 without requiring the truck to be turned around as it would have to be if it were rolled on its main wheels 13.

When the wheels 24 are in their elevated positions as described, the truck or device may be moved lengthwise and steered in the usual way on the main wheels 13 and the casters 18, as explained, to a position, for instance in front of a counter, and then by turning the crank handle 34 and crank shaft 32 to lower the wheels 24 and elevate the main wheels 13, the truck can then be moved bodily sidewise into a restricted space beneath the counter without turning the body or frame.

The controlling mechanism described is relatively simple and sturdy, consists of few parts which are easily installed and are compactly arranged within the walls of the frame 10, and by a simple movement of the crank handle 34, the wheels 24 may be easily lowered or elevated, as desired, and secured in either position.

I claim as my invention:—

1. In a truck, the combination of a frame, a pair of carrying wheels rotatable in planes extending longitudinally thereof, a caster swivelled on said frame and cooperating with said wheels to support and steer the truck, a pair of auxiliary wheels arranged at right angles to said carrying wheels, a pair of levers pivoted on said frame and on each of which one of said auxiliary wheels is journalled, a single operating lever pivoted on said frame and connected to said pair of levers, and means for swinging said operating lever on its pivot to rock said other levers, whereby said auxiliary wheels are lowered and said carrying wheels are raised to permit said truck to be supported by and be moved sidewise of said frame on said auxiliary wheels and casters.

2. In a truck, the combination of a frame, a pair of carrying wheels rotatable in planes extending longitudinally thereof, a caster swivelled on said frame and cooperating with said wheels to support and steer the truck, a pair of auxiliary wheels arranged at right angles to said carrying wheels and mounted to move up and down, a single operating lever pivoted on said frame and connected to said auxiliary wheels, a crank shaft journalled on said frame and having a crank movably connected to said operating lever and adapted to swing said operating lever on its pivot, whereby said auxiliary wheels are lowered and said carrying wheels are raised to permit said truck to be supported by and be moved transversely on said auxiliary wheels and casters, and said crank being adapted to move beyond a dead center position and engage a part for positively holding said auxiliary wheels in said lowered position.

3. In a truck, the combination of a frame, a pair of carrying wheels rotatable on a transverse axle on said frame, a caster swivelled on said frame and cooperating with said wheels to support and steer the truck, a pair of auxiliary wheels arranged at right angles to said carrying wheels and normally disposed in an elevated inoperative position, a pair of levers pivoted between their ends on said frame and on the outer end of each of which one of said auxiliary wheels is journalled, a single operating lever pivoted between its ends on said axle and connected to the inner ends of said other levers, and means for rocking said operating lever on its pivot to swing said other levers to lower said auxiliary wheels and elevate said carrying wheels, whereby said truck is adapted to be supported by and moved directly sidewise on said auxiliary wheels and casters.

4. In a truck, the combination of a frame, a pair of carrying wheels rotatable about fixed axes, a caster swivelled on said frame and cooperating with said wheels to support and steer the truck, a pair of auxiliary wheels arranged at right angles to said carrying wheels and normally disposed in an elevated inoperative position, an operating lever connected to said auxiliary wheels, and a crank shaft having a crank connected to said operating lever and adapted, when said shaft is turned in one direction, to actuate said lever to lower said auxiliary wheels and elevate said carrying wheels, and when turned in the opposite direction to raise said auxiliary wheels and lower said carrying wheels, said crank being adapted to move in each direction beyond a dead center position for engaging parts on said operating lever to positively hold said auxiliary wheels respectively in their raised and lowered positions.

ELLIS CLYDE BUSH.